Oct. 6, 1964 A. E. DE MOTT 3,152,242
COOKING APPLIANCE OR TOASTER
Filed Feb. 25, 1963 2 Sheets-Sheet 1

Inventor:
Alfred E. De Mott,
by Laurence R. Kempton
His Attorney

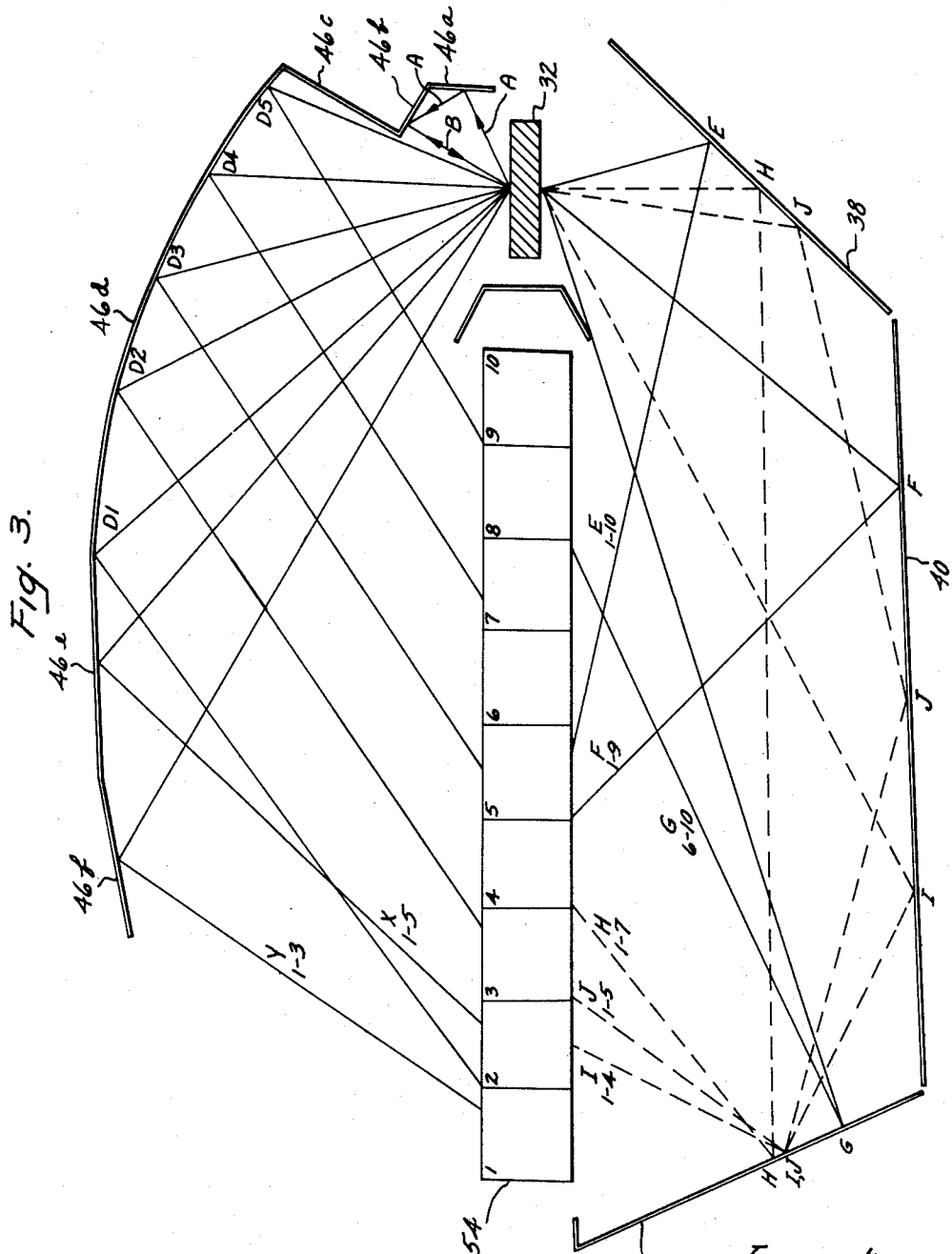

United States Patent Office 3,152,242
Patented Oct. 6, 1964

3,152,242
COOKING APPLIANCE OR TOASTER
Alfred E. De Mott, Allentown, Pa., assignor to General Electric Company, a corporation of New York
Filed Feb. 25, 1963, Ser. No. 260,430
17 Claims. (Cl. 219—347)

In a copending application by Theodore E. Andrews, Serial No. 260,444, filed February 25, 1963, assigned to the General Electric Company, as is the present application, there is disclosed a new and improved cooking appliance or toaster of the type having a horizontally disposed toasting rack for supporting the food to be toasted. The toaster includes a heating unit positioned to the rear of the rack area and an upper and a lower reflection system for relecting radiant heat energy from the heater onto the rack area. An important unique feature of this toaster is that the upper reflection system extends over only a portion of the rack area so that the user can easily place food onto the rack and remove it from the rack by hand without touching the heated portions of the toaster. The present invention relates in part to an improvement to the upper reflection system for such a toaster. The invention also relates to the lower reflection system which is described and broadly claimed in the above-mentioned Andrews' application. The lower system is more specifically claimed herein.

To make the open style toaster discussed above practical, the upper heat reflection system should not only provide a uniform toasting pattern but should in addition minimize the escape of reflected heat radiation from beyond the rack area. Naturally, the escape of reflected radiant heat energy beyond the front portion of the rack area lowers the efficiency of the toasting operation. Also since the temperature surrounding the toaster is raised somewhat by convection it is desirable that the reflected heat be minimized to prevent the toaster and the surrounding area from becoming uncomfortably hot to the user.

Accordingly, it is a primary object of this invention to provide a cooking appliance or toaster having a horizontally disposed toasting chamber and a unique heat reflection system to toast bread or similar food on both sides at the same time with a minimum amount of reflected heat escaping from the toaster.

It is a further object of this invention to provide an improved reflector for the upper reflection system of a toaster of the type having a horizontally disposed toasting chamber with a heater positioned to the rear of the toasting area.

It is another object of this invention to provide such an improved reflector which has a surface for reflecting heat in substantially parallel lines towards the rack area and which minimizes the escape of reflected heat beyond the rack area.

Yet another object of the invention is to provide a toaster of the type having a horizontally disposed toasting chamber and a heater positioned to the rear of the toasting area with a unique lower reflection system for reflecting heat in an essentially uniform intensity onto the rack area.

Yet another object of this invention is to provide such a toaster with a lower reflection system which will continue to reflect radiant energy upwardly onto the toasting area in a substantially uniform pattern even with a considerable accumulation of crumbs or other material on the portion of the reflective system directly beneath the toasting area.

Briefly stated, one embodiment of the toaster of the invention includes a horizontally disposed food supporting rack with an elongated heater positioned at the rear of the rack. A shield positioned between the heater and the rack prevents radiant heat from emanating directly onto the rack area. Heat reflecting surfaces are so shaped and positioned in the lower part of the toaster that radiant heat from the heater is reflected at essentially uniform intensity in an upwardly direction over the rack area. Heat reflecting surfaces positioned in the upper portion of the toaster extend over only a portion of the rack area to reflect radiant heat from the heater at essentially uniform intensity downwardly over the rack area, while preventing or minimizing the escape of radiant heat energy beyond the rack area. One of the upper heat reflection surfaces is given a parabolic cross-section and positioned so that the center of the heater represents the focus of the parabola and heat is thus reflected from the surface in substantially parallel lines toward the rack area. Such a toaster provides an efficient toasting operation with a minimum loss of heat while also providing ready access to the rack area and requiring no complicated food moving mechanisms.

Further features, objects and attendant advantages will become apparent with reference to the following description and drawings in which:

FIG. 3 is a schematic view of the reflection system of the toaster.

Figure 1:
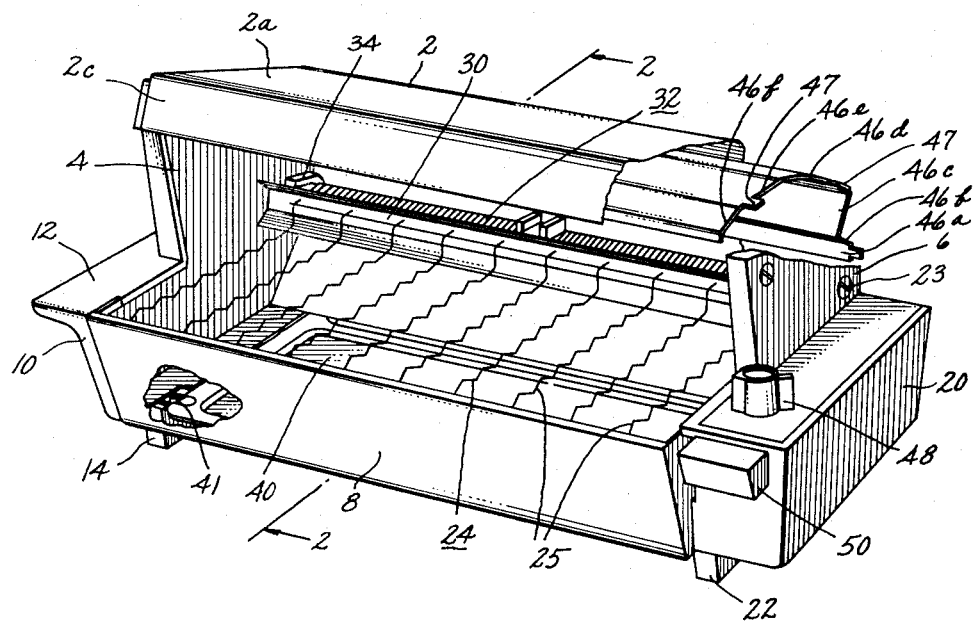
FIG. 1 is a perspective partially cutaway view of the new and improved toaster of the invention.
Figure 2:
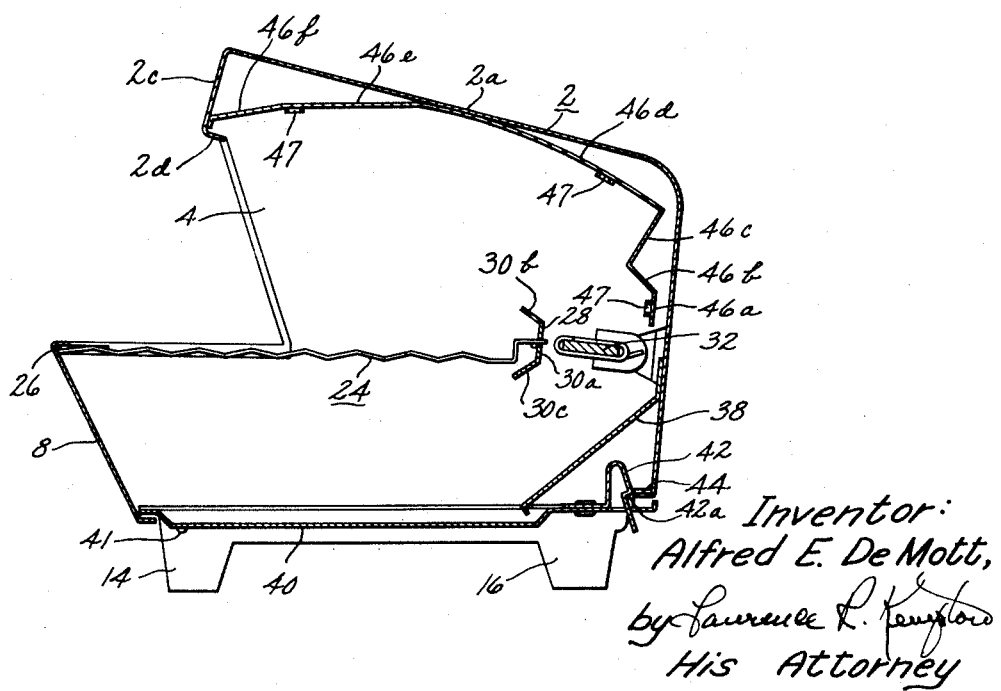
FIG. 2 is a cross-sectional view of the toaster of the invention taken along the lines 2—2 of FIG. 1.

The openness and simplicity of construction of the unique toaster described herein may be partially appreciated from a brief perusal of FIGS. 1 and 2. It may be seen that the toaster includes an outer shell member 2 which forms a top wall 2a covering only a portion of the toaster, and forming a rear wall 2b extending to the lower rear edge of the toaster. A front portion of the top wall 2a is bent to form a downwardly extending wall 2c. The outer shell member 2 fits over and is hooked to the top front edge of a left-hand sheet metal end plate 4 and a similar right-hand end plate 6.

It may be seen that the side plates 4 and 6 have front edges which extend upwardly at an angle with respect to the vertical and which support a mating front wall 8 in any suitable fashion. The left-hand plate 4 is secured to an end support member 10 having a shape similar to the end plate 4 and including an outwardly extending flange 12 and downwardly extending legs 14 and 16. The support member 10 is preferably made of plastic or similar electrically and heat insulating material. Plastic of course is easily molded so that the support member may be formed as an integral piece. The right-hand plate 6 is secured to an upper support member 18 and a lower member 20 which serves as a support and a housing for the toaster controls which will be hereinafter described. The housing 20 is provided with legs similar to legs 14 and 16 one of which is shown at 22 in FIG. 1. The flange 12 and housing 20 make convenient handles for lifting or moving the toaster, even while hot. The end plates may be secured to the plastic support members by any suitable fastening devices such as screws 23, shown installed in support member 18.

The remaining external element of the toaster is a bottom wall 40 extending from the lower edge of rear wall 2b forwardly to the lower edge of front wall 8. Bottom wall 40 extends beneath the rack 24 in roughly parallel relation to the rack to serve as a crumb tray for crumbs and other material. To permit periodic removal of the accumulated material, the tray should be removably secured to the surrounding structure, in some convenient manner. For example, the leading edge of the tray may be provided with integrally formed hinge pins on each end, one of which is shown at 41 in FIG. 1. The hinge pins are adapted to be received in mating holes in plates 4 and 6 and aligned recesses or sockets in the plastic support members 10 and 20 so that the tray may be swung downwardly about the axis formed by the pins.

The rear edge of the crumb tray 40, as seen from FIG. 2, is provided with a flat spring doubled on itself to form an irregularly shaped resilient clip 42 having one end riveted to the crumb tray and the other end extending through the opening in the tray to provide a manually movable latch accessible from the bottom rear portion of the toaster. The clip 42 is provided with a shoulder 42a which cooperates with a forwardly extending flange 44 on the rear wall 2b. When the clip is positioned as shown in FIG. 2, shoulder 42a abuts flange 44 to hold the tray in its closed position. By manually moving the accessible end of the clip 42 forwardly against the resiliency of the clip, the tray may be easily swung downwardly.

Turning now to the internal components of the toaster, the principal elements are a food or toast supporting rack 24, a heater 32, a guard or shield 30 extending between the rack and the heater, and upper and lower heat reflection systems. The rack 24 is formed from a plurality of spaced wires 25 extending from front to rear in parallel relation to each other and the side plates 4 and 6. The wires 25 are attached to a front support wire 26 and a rear support 28, with the wire 26 being secured to the front wall 8 and the rear ends of wires 24 extending through apertures formed in shield 30. As may be seen from FIG. 1 and 2, each of the wires 25 is formed with a plurality of bumps or sinuations in the vertical plane so that the entire upper surfaces of the wires do not contact the bread or other food supported thereon, minimizing the possibility of burning or marking the food. As can be seen from the drawings, the rack extends in a substantially horizontal position and in roughly parallel relation to the crumb tray 40.

Naturally, the rack 24 may be sized as desired, but a convenient area is one large enough to handle two standard sized bread slices when placed side by side with their bottom surfaces in contact with the rear vertically extending portions of the rack wires 25. To facilitate the inspection and the removal and insertion of food, the rack 24 is adequately spaced from the lower edge of the top forward wall 2c and its rearwardly extending flange 2d. For example, in a production model of the toaster, this dimension is approximately 2¼ to 2½ inches, or roughly twice the size shown in the drawings.

In accordance with the invention, heat is provided by the single stick type heater 32 having a ceramic core extending between the two end plates 4 and 6 with a resistance wire wound thereon. The heater core is mounted on suitable ceramic supports on each end, one of which is shown at 34 secured to the end plate 4, and an additional center support 36 is shown riveted to the shield 30. It should be noted that the heater 32 is positioned in approximately the plane which would be occupied by a slice of bread when placed on the rack 24. The cross-sectional shape of the heater ceramic core has been carefully selected to obtain the necessary heat output, strength and rigidity, and the proper relation between shield 30 and the food to be placed on the rack.

The bread or food to be placed on the rack 24 is to be toasted entirely by reflected radiant heat energy. Thus it is desirable to utilize a heater which will provide maximum heater surface image on the reflective surfaces while having a minimum of heater surface which will not be reflected onto the reflective surfaces, thereby minimizing ambient temperatures. Therefore, the front and rear surfaces presented by the heater 30 should be as thin in the vertical direction as possible. On the other hand, the length of the heater, being slightly greater than the width of two standard slices of bread, requires that the ceramic core be of sufficient thickness to give the needed rigidity to withstand the shocks and abuse to which the appliance may normally be expected to be subjected. These various factors dictate that a relatively flat, somewhat rectangular heater cross-section is most desirable with the flat or longer dimension of the core being substantially parallel to the rack.

The shield 30 is an elongated member having a vertically disposed central section 30a and upper and lower forwardly extending flanges 30b and 30c. The ends of the shield are secured to the end plates 4 and 6, respectively, in any suitable manner such as mating tabs and slots. With a heater as described above, the shield central section 30a need only be approximately the height equal to the thickness of a standard slice of bread to prevent radiant energy from emanating directly from the heater onto a slice of bread placed on the rack 24. With the addition of the forwardly extending flanges 30b and 30c radiant heat energy is also prevented from escaping directly from the heater through the front opening of the toaster defined by the lower front portion of the shell 2 and the top edge of front wall 8.

To reflect heat onto the bread rack area from above and from below simultaneously, the toaster has been uniquely provided with a series of reflecting surfaces. The lower reflective system includes the inner planar surface of element 38, the inner surface of crumb tray or bottom wall 40 and the inner surface of front wall 8. Element 38 extends forwardly beneath heater 32 at an obtuse angle from the rear wall 2b toward the crumb tray 40. Element 38 may be supported by end plates 4 and 6 by any suitable means such as mating slots and tabs. Incidentally, an upper vertically extending portion 38a of element 38 engages the rear wall 26 and serves to assist in supporting the outer shell 2 by suitably connecting the engaging surfaces. Front wall 8 extends forwardly and upwardly from crumb tray 40 forming an obtuse angle with the crumb tray and being in roughly perpendicular relation to element 38.

The prime objective of the lower reflector system is, of course, to obtain an even toasting pattern in an efficient manner on the bottom surface of the toast. As a corollary to this objective, it is necessary to minimize the contribution of energy reflected off the crumb tray 40 to the toasting pattern to thus minimize the drop in toasting efficiency and distortion of the pattern when the crumb tray becomes covered with crumbs, butter stains, burned-on cheese, etc. To accomplish these objectives, the materials and areas of the reflective surfaces and the angular relationships between the reflective surfaces, the heater and the rack area have been carefully selected. Surface 38 provides the major portion of the reflected energy because of several factors. It is close to heater 30, and the angular position of surface 38 to the plane of the bread is such that the reflected image of the heater 30 contributes to substantially the entire bottom portion of the bread. Naturally a greater contribution of energy is received on the rear portion since the rays are shortest in this area. Further, surface 38 is made of bright aluminum which has an extremely high reflectivity factor for reflecting infrared energy.

The inner surface of crumb tray 40 is made of a material having a lower reflectivity factor such as aluminized steel which has a factor of about .53 relative to bright aluminum, or only a little over half as effective as bright aluminum for reflecting infrared energy. Thus, the intensity of energy from the crumb tray is relatively low so that the toasting pattern and efficiency of the toaster is little affected by even a considerable accumulation of crumbs or other material on the surface. In this connection, it should be noted that the forward edge of surface 38 is positioned sufficiently to the rear of the rack area such that an accumulation of crumbs on the crumb tray does not interfere with the reflection of energy from surface 38 directly onto the rack area.

The inner surface of front wall 8 is designed to fill in the toasting pattern in the front portion of the lower bread surface. With the other surfaces 38 and 40, it has been found that a finish of chrome plated steel is preferable for the inner surface of wall 8. It has a reflectivity factor of approximately .70 relative to bright aluminum, which is greater than that of the crumb tray surface but less than that of the bright aluminum utilized for element 38.

The energy contributions made by the three reflective surfaces in the lower heat reflecting system may be more clearly understood with reference to the schematic diagram of FIG. 3. In the diagram, lines have been drawn from the midpoint of the lower surface of the heater 30 to the various reflective surfaces. It should be understood that the lines represent the entire band of radiant energy emanating from the heater toward a particular surface area even though the line is shown drawn from the midpoint of the heater. Also, the lines have been shown as striking the reflective surface at approximately the midpoint of the band of energy which is eventually reflected onto the lower surface of the rack area. A standard slice of bread 54 is schematically shown in the position it would occupy when supported by the rack 24. The edge surface of the bread has been broken into equal sections to more easily visualize the area covered by the band of reflected energy received from a particular reflective surface.

As shown, the solid line E emanating from heater 30 strikes reflective surface 38 and is reflected to a point midway between the lower edges of the bread 54. As indicated by the numbers 1–10, the line E represents a band of energy which covers substantially the entire lower surface of the bread. It is this reflective heat source which provides the majority of energy to the lower surface of the bread. Of lesser significance is the reflected energy band indicated by the line F which strikes the crumb tray 40 and is reflected upwardly striking the lower surface of the bread 54 between the lines 1 and 9. Solid line G represents the energy directly received from the heater by front wall 8 to fill in the toasting pattern between the lines 6–10 on the rear portion of the bread 54. The remaining dotted lines H, I and J represent multiple reflections which are utilized to primarily fill in the toasting pattern at the front portion of the lower bread surface. Naturally, due to the length of the reflective paths represented by these dotted lines and the compounded reflectivity factors involved, the energy contribution of these multiple reflections is relatively low. Nevertheless, they are an important factor in obtaining a uniform toasting pattern.

The portions of the toaster described in the foregoing paragraphs are substantially the same as the toaster described in the aforementioned Andrews application wherein the toaster including the lower reflection system is broadly claimed. The present invention relates to the specific structure of the lower system and to improvements in the upper system. The upper system includes a unique reflecting member 46 which extends over no more than approximately 75% of the rack area and has a plurality of reflective surfaces extending throughout the length of heater 32. Reflector 46, having a cross-sectional shape which roughly conforms to that of the outer shell 2, may be supported by tabs 47 cooperating with slots formed in the end plates 4 and 6, as can be seen in FIG. 2.

The reflective surfaces of reflector 46 extending from the rear of the toaster forwardly have been labelled 46a through 46f. Surfaces 46a, 46b and 46c are positioned above and slightly to the rear of heater 32 in an area where little heat can be reflected directly onto the rack area of the toaster. In accordance with the invention, the primary function of these three surfaces is to conserve heat by preventing heat energy from being reflected out the front opening of the toaster and by reflecting energy back into the heater.

Surface 46a is an element having a short or narrow vertical dimension and is vertically positioned to the rear of the heater 32 and adapted to receive relatively little radiant heat, a portion of which is reflected onto the surface 46b schematically represented by the line A in FIG. 3. The remaining energy from 46a is reflected directly onto 46e and 46f; and from there a portion is further reflected onto the rack area.

Surface 46b is connected to the upper edge of surface 46a and forms an obtuse angle of roughly 135° therewith. This surface is positioned in a substantially perpendicular or normal relation to the bulk of the radiant heat rays emanating from the heater 32. Accordingly, most of the radiant heat striking surface 46b is reflected directly back into the heater 32 as schematically represented by line B in FIG. 3, thereby raising the temperature of the heater and preventing the heat from escaping out the front opening of the toaster.

Surface 46c adjoins the leading edge of surface 46b forming an angle of almost 270° with surface 46b on the side of the reflector facing the interior of the toaster. As seen in FIG. 3, surface 46c is positioned such that energy rays emanating from the rear portion of heater 32 cannot strike the surface of 46 and the rays emanating from the front portion of the heater are in substantially parallel relation to surface 46c. As a result, surface 46c receives relatively little heat from the heater and thus contributes little toward the toasting pattern of the upper reflection system. More importantly, surface 46c does not reflect heat out the front opening of the toaster.

The uniqueness of the surfaces 46a, 46b and 46c can perhaps be more easily appreciated by considering the situation which would exist if these three surfaces were simply replaced by a single vertical surface positioned at the rear of the toaster. With such a single surface, a considerable portion of heat would be received from the heater 32 some of which would be eventually reflected onto the rack area, which would be quite satisfactory, but the remainder of the energy would be undesirably reflected out the front opening of the toaster.

In accordance with the invention, surface 46d is given a parabolic cross-section to further decrease the heat loss and raise the efficiency of the toaster. More specifically, surface 46d joins the upper edge of surface 46c above the rear of heater 32 and extends forwardly over the rear portion of the rack area. As viewed in FIG. 2, the focal point of the parabolic cross-section of the reflector surface 46d is the midpoint of the upper surface of heater 32. Thus, considered in its entirety, a longitudinal line extending along the middle of the upper surface of heater 32 represents all the focal points of the reflector 46d. It will be recalled that a principle of a parabolic surface is that energy rays emanating from the focus and striking the parabolic surface are reflected in parallel paths. Reflecting surface 46d is so positioned and shaped with respect to heater 32 and the rack 24 that the energy travelling from the focal line on heater 32 directly onto surface 46d is reflected in parallel paths downwardly onto the area occupied by a standard slice of bread when placed onto the rack.

This is graphically illustrated in FIG. 3 wherein, a plurality of lines D are shown emanating from the midpoint or focal line on heater 32 and striking surface 46d. As previously explained, although drawn from the midpoint, these lines represent the entire band of energy reflected onto the slice of bread 54. It can be seen that line D1 striking the forward edge of surface 46d is reflected onto the front portion near point 2 of the upper surface of the bread. It should be understood that although the line D1 is shown striking the bread surface at point 2, this is actually only approximately the midpoint of the band of energy striking the surface as represented by D1. For example, if energy is to strike point 1 after being reflected from surface 46d at the point where D1 strikes 46d, the energy really emanates from the extreme rear portion of the heater 32. Nevertheless, to simplify the illustration, line D1 is intended to represent such extreme rays also.

The remaining parallel lines D2–D5, which are representative of the other bands of reflected energy, fill in the toasting pattern so that surface 46d provides reflected heat for substantially the entire upper surface of the bread. In this connection, it should be further understood that only those rays emanating from the focal line are reflected in truly parallel paths off the parabolic surface. However, the importance of the arrangement is that nearly all of the rays striking the parabolic surface are confined to reflect onto the rack area even though not all rays are parallel. Also, it can be accurately said that the large portion of rays from the heater are reflected in generally or substantially parallel paths off the parabolic surface onto the rack area. It will be appreciated that the energy paths become progressively shorter when moving from the leading edge of the rack area towards the rear; and accordingly, the energy reflected onto the rear portion of the bread is more intense at the rear of the bread slice.

Surface 46e is a planar reflective surface whose rear edge adjoins the forward edge of surface 46d. The surface 46e extends over a central portion of the rack 24 and adjoins the rear edge of planar reflective surface 46f.

As with the reflective surfaces of the lower system, surfaces 46d, 46e and 46f have been sized and arranged, with respect to each other, the heater, and the rack 24, so that radiant heat from the heaters striking the reflective surfaces is reflected downwardly towards the rack area at substantially uniform intensity. Naturally the reflectivity factor of reflector 46 has an important bearing on the toasting pattern obtained. In the present instance, reflector 46 has been given a bright aluminum surface having a reflectivity factor of approximately 1.0.

Reflective surfaces 46e and 46f are positioned to fill in the toasting pattern and are primarily directed to strike the front portion of the bread. As shown in FIG. 3, the line X striking surface 46e and being reflected onto the bread 54 represents the midpoint of the band of heat energy striking surface 46e and ultimately being reflected onto the bread sections indicated by lines 1–5. Similarly, line Y represents the band of energy reflected off surface 46f onto a portion of the upper bread surface represented by the lines 1–3.

The effectiveness of the improved upper reflector 46 as compared with the reflector described in the aforementioned Andrews application is such that for a medium, dark piece of toast, the time from a cold start has been reduced 25%, or almost one minute. To attain this improvement, more of the energy had to be retained in the toasting chamber and thus an improvement was also gained in the amount of energy escaping from the front of the toaster which could be annoying to the user.

Thus, it can be seen that although reflector 46 and outer shell 2 extend over no more than approximately 75% of the rack area, the reflecting surfaces are uniquely arranged so that an even toasting pattern is obtained and the amount of radiant heat lost through the front opening defined by outer shell 2 and front wall 8 is kept at a minimum. With such an arrangement, the toaster and surrounding area are kept sufficiently cool so that the user can conveniently place food onto the rack area by hand and remove the food by hand after the toasting operation. Such action is very simple and convenient and hence the need for expensive food moving mechanisms utilized in most toasters is eliminated. Also, such an arrangement not only permits the user to interrupt the toasting cycle at the exact desired point, but additionally has further appeal in that it permits the user to watch the interesting phenomena of a toasting operation.

It will be understood from the foregoing that certain aspects of the invention are not limited to the particular details of construction illustrated, and it is contemplated that other modifications and variations will occur to those skilled in the art. Accordingly, it is intended that the appended claims shall cover such modifications and variations that do not depart from the true spirit and scope of the invention.

What is claimed is:

1. In a toaster, a grill-like food supporting rack, means for supporting said rack in a horizontal position, an elongated heater extending along and adjacent substantially the entire rear edge of said rack, a shield extending the length of said heater between the heater and the rack to prevent direct radiation onto said rack area, a heat reflection system including heat reflection means for reflecting radiant heat from said heater at essentially uniform intensity downwardly over the entire rack area, said heat reflection means extending over no more than 75% of said rack area to permit food to be easily placed onto and removed from the rack by hand without contacting the surrounding toaster structure, said heat reflection means including a parabolic reflection surface positioned so that substantially all the radiant heat from said heater striking the surface is reflected toward the rack area.

2. A toaster comprising a food supporting rack supported in a horizontal position, an elongated heater extending along and adjacent substantially the entire rear edge of said rack, a shield positioned between said heater and said rack to prevent radiant heat from said heater from emanating directly onto the rack area, and upper heat reflection means extending over not more than seventy-five percent of the rack area to reflect radiant heat from said heater at essentially uniform intensity downwardly over the rack area, said upper heat reflection means including a surface having a parabolic cross-section and positioned so that said heater includes the focal line of the parabola and heat emanating from the line on the heater is reflected from said surface in substantially parallel lines toward the rack area.

3. In an electric appliance, a food supporting rack supported in a generally horizontal position, an elongated heater extending along and adjacent substantially the entire rear edge of said rack, a heat reflection system including upper heat reflection means extending over only a portion of the rack area to reflect radiant heat from said heater at essentially uniform intensity downwardly over the rack area, said upper heat reflection means including a metallic member having a plurality of reflective surfaces extending the length of said heater and comprising one surface positioned to reflect heat back into the heater, a surface having a parabolic cross-section for reflecting heat radiation in substantially parallel paths towards the rack area, a connecting surface extending between said one surface and the rear of said parabolic surface at an angle to receive a minimal amount of radiant heat from said heater, and additional planar surfaces adjoining the front edge of said parabolic surface for directing heat from said heater downwardly toward the rack area and to restrict outward radiation beyond the rack area.

4. A toaster comprising a bread supporting rack; means for supporting the rack in a horizontal position; an elongated heater extending along and adjacent substantially the entire rear edge of said rack; lower heat reflection means to reflect radiant heat from said heater at substantially uniform intensity in an upward direction to the rack area, said heat reflection means including a rear planar surface angularly positioned beneath said heater to reflect heat forwardly beneath said rack area and upwardly towards said rack area, a bottom planar surface of limited reflective value extending beneath said rack, and a front surface angularly extending upwardly and forwardly from the bottom surface toward the front edge of said rack for receiving heat reflected from said rear planar surface and directing the heat upwardly onto the rack area, and an upper heat reflection means extending over only a portion of the rack area to reflect radiant heat from said heater at essentially uniform intensity downwardly over the rack area, said upper heat reflection means including a parabolic reflecting surface for reflecting radiation in substantially parallel paths toward the rack area and for restricting outward radiation beyond the rack area.

5. In a toaster, a horizontal food supporting rack, an elongated heater extending along and adjacent substantially the entire rear edge of said rack, a shield positioned between the heater and said rack, a heat reflection system including means extending over less than seventy-five percent of the rack area to reflect radiant heat from said heater at essentially uniform intensity downwardly over the rack area, said heat reflection means including a substantially vertical surface positioned to the rear of said heater, one surface adjoining said rear surface and positioned to reflect heat energy back into the heater, a parabolic reflecting surface reflecting radiant heat energy in substantially parallel paths towards the rack area, and a surface connecting said one surface and the rear edge of said parabolic surface and positioned to receive minimal radiant heat energy from said heater.

6. In a toaster, a horizontal food supporting rack, an elongated heater extending along and adjacent substantially the entire rear edge of said rack, a shield positioned between the heater and said rack, and heat reflection means extending over said heater and over less than seventy-five percent of the rack area to reflect radiant heat from said heater at essentially uniform intensity downwardly over the rack area, said heat reflection means including one surface positioned to reflect heat back into the heater, a parabolic reflecting surface reflecting radiation in substantially parallel paths towards the rack area, a surface connecting said one surface and the rear edge of said parabolic surface, said connecting surface being oriented such that the energy rays emanating from the rear portion of said heater cannot strike the surface and such that the energy rays emanating from the front portion of the heater are substantially parallel to said surface so that the surface provides minimal reflection from said heater, and reflective surfaces adjoining the front edge of said parabolic surface for directing radiation from said heater downwardly toward the rack area and to restrict outward radiation beyond the rack area.

7. In a toaster, a horizontally disposed food support, an elongated heater extending along and adjacent substantially the entire rear edge of said support, a shield positioned between the heater and the support, heat reflection means extending over only a portion of the support area to reflect radiant heat from said heater at essentially uniform intensity downwardly over the support area, said reflection means including a vertically extending planar surface positioned to the rear of said heater and above the level of the heater, one surface adjoining the upper edge of said rear vertical surface and forming an obtuse angle with said vertical surface, said one surface extending over the rear portion of said heater to reflect radiant energy back into the heater, a planar connecting surface adjoining the forward edge of said one surface and extending at an angle to receive a minimum of radiant heat energy from the heater, and a plurality of additional surfaces extending consecutively from the upper edge of said connecting surface forwardly over only a portion of the rack area.

8. In a toaster, a horizontally disposed food support, an elongated heater extending along and adjacent substantially the entire rear edge of said support, a shield positioned between the heater and the support, lower heat reflection means for reflecting radiant heat from said heater at essentially uniform intensity in an upward direction over the support area, and upper heat reflection means extending over only a portion of the support area to reflect radiant heat from said heater at essentially uniform intensity downwardly over the support area, said upper reflection means including a vertically extending planar surface positioned to the rear of said heater and above the level of the heater, one surface adjoining the upper edge of said rear vertical surface and forming an obtuse angle with said vertical surface, said one surface extending over the rear portion of said heater to reflect radiant energy back into the heater, a planar connecting surface adjoining the forward edge of said one surface and extending at an angle to receive a minimum of radiant heat energy from the heater, and a plurality of additional surfaces extending consecutively from the upper edge of said connecting surface forwardly over a portion of the rack area.

9. In a toaster, a substantially horizontally disposed food support, an elongated heater extending along and adjacent substantially the entire rear edge of said support, lower heat reflection means for reflecting radiant heat from said heater at essentially uniform intensity in an upward direction onto the support area, and upper heat reflection means extending over only a portion of the support area to reflect radiant heat from said heater at essentially uniform intensity downwardly over the support area, said lower heat reflection means including a back reflection surface extending angularly beneath said heater primarily directing heat forwardly and upwardly, a front reflection surface positioned to receive radiant heat energy and direct it upwardly, and a bottom crumb tray of limited reflective value positioned beneath said food support and reflecting downwardly directed radiant energy upwardly.

10. A toaster comprising a bread supporting rack, means for supporting the rack in a substantially horizontal position, an elongated heater extending along and adjacent substantially the entire rear edge of said rack, an elongated shield extending between the heater and said rack, lower heat reflection means to reflect radiant heat from said heater at substantially uniform intensity in an upward direction over the rack area, a bottom wall extending beneath said rack in spaced substantially parallel relation to the rack, said bottom wall including a movable crumb tray forming a portion of limited reflective value of said lower heat reflection means, and an upper heat reflection means extending over only a portion of the rack area to reflect radiant heat from said heater at essentially uniform intensity downwardly over the rack area.

11. In a toaster, a horizontally disposed food support, an elongated heater, extending along and adjacent substantially the entire rear edge of said support, a shield positioned between the heater and the support, lower heat reflection means for reflecting radiant heat from said heater at essentially uniform intensity in an upward direction over the food support area, and upper heat reflection means extending over only a portion of the support area to reflect radiant heat from said heater at essentially uniform intensity downwardly over the support area, said lower heat reflection means including a back planar reflection surface directing heat forwardly and upwardly, a front planar reflection surface to receive radiant heat and direct it rearwardly and upwardly, and a bottom crumb tray of limited reflective value reflecting downwardly directed radiant heat upwardly.

12. An electric toaster comprising a food supporting rack supported in substantially horizontal position, a pair of support members each located on opposite ends of said rack, an elongated heater extending between said support members at the rear of said rack in a plane parallel to the rack, an elongated shield extending between the heater and the said rack, an outer shell member extending between said support members and forming a rear wall positioned behind said heater and forming a top wall extending from said rear wall over no more than 75% of the rack area, a bottom wall extending from said rear wall beneath the heater and the rack, a portion of said bottom wall being movably mounted to permit the removal of crumbs falling thereon from the rack area, a front wall extending between said support members and extending upwardly and forwardly from the front edge of said bottom wall toward the front edge of said rack, the top wall of said shell member and said front wall defining an opening for permitting easy hand access to said rack, means for controlling the operation of said toaster positioned adjacent one of said support members, and a heat reflection system positioned within said toaster to reflect radiant heat from said heater at essentially uniform intensity onto the rack area.

13. An electric toaster comprising a food supporting rack supported in substantially horizontal position, a pair of support members each located on opposite ends of said rack, an elongated heater extending between said support members at the rear of said rack in a plane parallel to the rack, an elongated shield extending between the heater and the said rack, an outer shell member extending between said support members and forming a rear wall positioned behind said heater and forming a top wall extending from said rear wall over no more than 75% of the rack area, a bottom wall extending from said rear wall beneath the heater and the rack, a portion of said bottom wall being movably mounted to permit the removal of crumbs falling thereon from the rack area, a front wall extending between said support members and extending upwardly and forwardly from the front edge of said bottom wall toward the front edge of said rack, the top wall of said outer shell member and said front wall defining an opening for permitting easy hand access to said rack, means for controlling the operation of said toaster, upper heat reflection means positioned solely within said outer shell member to reflect radiant heat from said heater at essentially uniform intensity downwardly over the rack area, and lower heat reflection means to reflect radiant heat from said heater at substantially uniform intensity in an upward direction onto the rack area.

14. In a toaster, a substantially horizontally disposed food support, an elongated heater extending along and adjacent substantially the entire rear edge of said support, lower heat reflection means to reflect radiant heat from said heater at essentially uniform intensity in an upward direction onto the support area, upper heat reflection means extending over only a portion of the support area to reflect radiant heat from said heater at essentially uniform intensity downwardly over the support area, said lower heat reflection means including a back reflection surface extending angularly beneath said heater primarily to direct heat forwardly and upwardly, said back surface having a reflectivity factor approximately that of bright aluminum, a front reflection surface positioned to receive radiant heat energy and direct it upwardly, and a crumb tray positioned beneath said food support to reflect downwardly directed radiant energy upwardly, said crumb tray having an upper surface with a reflectivity factor of approximately one-half that of said back reflection surface.

15. A toaster comprising a bread supporting rack, means for supporting the rack in a horizontal position, an elongated heater extending along and adjacent substantially the entire rear edge of said rack, lower heat reflection means to reflect radiant heat from said heater at substantially uniform intensity in an upward direction onto the rack area, said heat reflection means including a highly reflective rear planar surface angularly positioned beneath said heater to reflect heat forwardly beneath said rack area and upwardly towards said rack area, a bottom planar crumb tray surface extending beneath said rack and having a reflectivity factor approximately one-half that of said rear planar surface, and a front surface angularly extending upwardly and forwardly from the bottom surface towards the front edge of said rack for receiving heat reflected from said rear planar surface and directing heat upwardly onto the rack area, said front surface having a reflectivity factor less than that of said rear planar surface but greater than that of said bottom surface.

16. An electric toaster comprising a food supporting rack horizontally positioned within the toaster, heating means extending along and adjacent substantially the entire rear edge of said rack, shielding means extending between said heating means and said rack to prevent radiation from being emanated directly onto said rack, lower heat reflection means for reflecting radiant heat from said heater at substantially uniform intensity in an upward direction onto the rack area, and an upper heat reflection system for reflecting radiant heat from said heater at substantially uniform intensity downwardly over the rack area, said upper heat reflection system extending over no more than 75% of said rack area to permit food to be easily placed onto and removed from the rack by hand without contacting the surrounding toaster structure, said upper heat reflection system including reflection means positioned over said heating means and over the rear portion of said rack and formed so that the heat emanating from the heating means is reflected in roughly parallel lines toward the rack area.

17. In a toaster, a horizontally disposed food support, heating means extending along and adjacent substantially the entire rear edge of said support, shielding means positioned between the heater and said support, lower heat reflection means for reflecting radiant heat from said heater at essentially uniform intensity in an upward direction over the support area, and upper heat reflection means extending over no more than 75% of the support area to reflect radiant heat from said heater at essentially uniform intensity downwardly over the support area, said upper heat reflection means including a parabolic surface positioned over said heating means and the rear portion of said food support and arranged so that the heat emanating from the heating means is reflected from said surface in substantially parallel lines toward the rack area.

References Cited in the file of this patent
UNITED STATES PATENTS

| | | |
|---|---|---|
| 1,393,368 | Henry | Oct. 11, 1921 |
| 1,587,023 | Mottlau | June 1, 1926 |
| 1,708,504 | Hunt | Apr. 9, 1929 |
| 1,885,041 | Baker | Oct. 25, 1932 |
| 1,954,128 | Heyroth et al. | Apr. 10, 1934 |
| 2,134,474 | Gillespie | Oct. 25, 1938 |
| 2,368,026 | Jepson | Jan. 23, 1945 |
| 2,862,441 | Schmall | Dec. 2, 1958 |
| 2,907,269 | Roderick et al. | Oct. 6, 1959 |

FOREIGN PATENTS

| | | |
|---|---|---|
| 413,636 | Italy | May 21, 1946 |